(12) United States Patent
Harper

(10) Patent No.: US 8,876,085 B2
(45) Date of Patent: Nov. 4, 2014

(54) JACK FOOT RETRACTION SYSTEM

(75) Inventor: Jason Harper, Springville, UT (US)

(73) Assignee: Progress Mfg. Inc., Provo, UT (US)

( * ) Notice: Subject to any disclaimer, the term of this patent is extended or adjusted under 35 U.S.C. 154(b) by 434 days.

(21) Appl. No.: 12/881,163

(22) Filed: Sep. 13, 2010

(65) Prior Publication Data

US 2011/0215286 A1 Sep. 8, 2011

Related U.S. Application Data

(60) Provisional application No. 61/241,897, filed on Sep. 12, 2009.

(51) Int. Cl.
| | |
|---|---|
| *B23P 11/00* | (2006.01) |
| *B60S 9/10* | (2006.01) |
| *B60S 9/06* | (2006.01) |
| *B60S 9/04* | (2006.01) |

(52) U.S. Cl.
CPC . *B23P 11/00* (2013.01); *B60S 9/10* (2013.01); *B60S 9/06* (2013.01); *B60S 9/04* (2013.01)
USPC .......................................... 254/423; 254/418

(58) Field of Classification Search
CPC .............. B60S 9/12; B60S 9/22; B60S 9/215
USPC ........................ 254/423, 418, 419, 420, 424
See application file for complete search history.

(56) References Cited

U.S. PATENT DOCUMENTS

| | | | |
|---|---|---|---|
| 3,595,527 A | 7/1971 | Douglass | |
| 3,801,068 A * | 4/1974 | Kopas | ........................... 254/419 |
| 3,957,249 A | 5/1976 | Williams | |
| 4,176,825 A | 12/1979 | Schwebke | |
| 4,580,804 A * | 4/1986 | Weber | ........................... 280/300 |
| 4,635,904 A | 1/1987 | Whittingham | |
| 4,662,610 A | 5/1987 | Cofer | |
| 4,711,428 A | 12/1987 | Carpenter | |
| 4,815,711 A | 3/1989 | Bruno et al. | |
| 4,871,183 A | 10/1989 | Moss | |
| 6,176,470 B1 * | 1/2001 | Breslin et al. | .................. 254/420 |
| 6,311,954 B1 * | 11/2001 | Breslin et al. | .................. 254/420 |
| 6,619,621 B2 | 9/2003 | Alten | |
| 6,764,065 B2 | 7/2004 | Fox | |
| 7,192,011 B2 * | 3/2007 | Meissner | ....................... 254/420 |
| 7,396,034 B2 | 7/2008 | Wilson, Jr. | |
| 2006/0214147 A1 * | 9/2006 | Meissner | ....................... 254/420 |
| 2009/0159863 A1 | 6/2009 | Scott et al. | |
| 2011/0215286 A1 * | 9/2011 | Harper | ........................... 254/423 |

FOREIGN PATENT DOCUMENTS

GB              837511        6/1960

* cited by examiner

*Primary Examiner* — Lee D Wilson

(74) *Attorney, Agent, or Firm* — Clayton, Howarth & Cannon, P.C.

(57) ABSTRACT

A system for supporting a vehicle. The system may include a vehicle jack in mechanical communication with a jack foot and a striker plate. The jack foot is rotatable relative to the vehicle jack on a rotation axis disposed on the vehicle jack and perpendicular to a long axis of the vehicle jack. The jack foot includes a base at a distal end of the jack foot. The jack foot also includes a cam surface at least in part at a proximal end of the jack foot. The cam surface is aligned with the striker plate and interacts with the striker plate to rotate the jack foot in response to movement of the vehicle jack from a lowered position to a raised position.

57 Claims, 12 Drawing Sheets

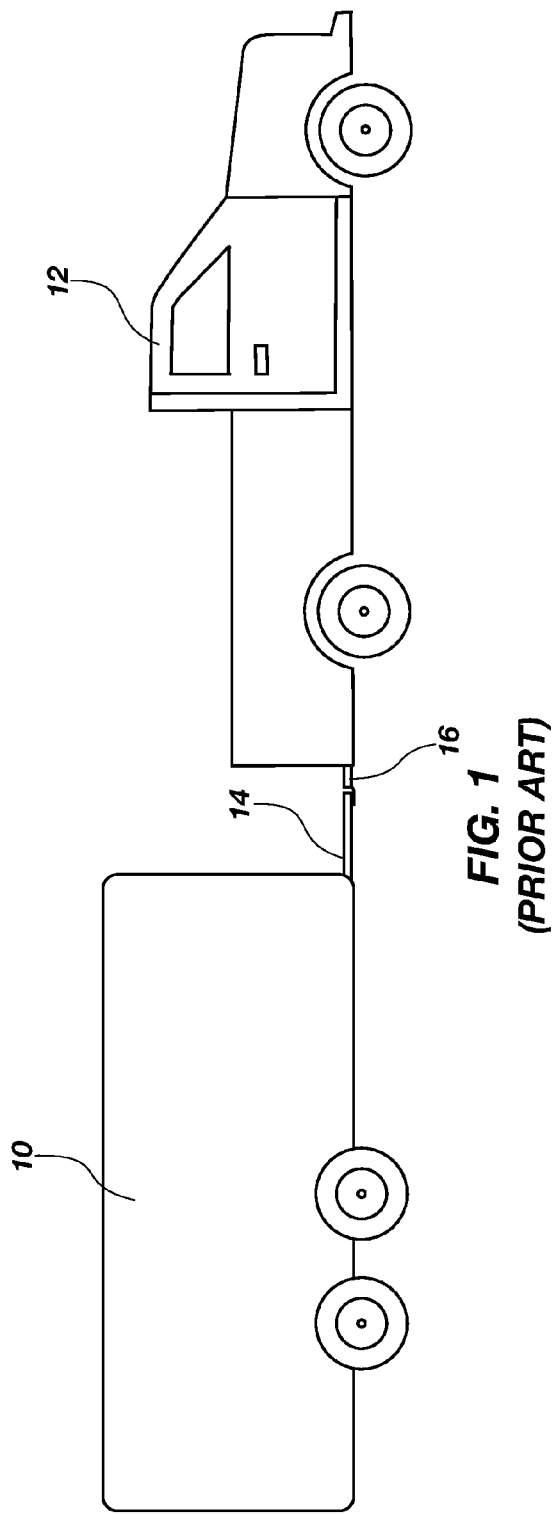
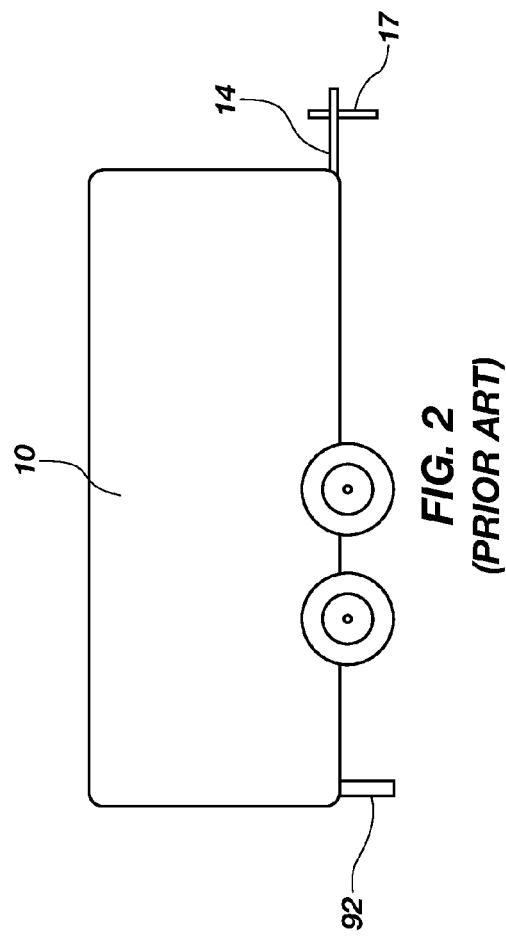
FIG. 1 (PRIOR ART)
FIG. 2 (PRIOR ART)

JACK FOOT RETRACTION SYSTEM

CROSS-REFERENCE TO RELATED APPLICATIONS

This application claims the benefit of U.S. Provisional Patent Application Ser. No. 61/241,897, filed Sep. 12, 2009, which is hereby incorporated by reference herein in its entirety, including but not limited to those portions that specifically appear hereinafter, the incorporation by reference being made with the following exception: In the event that any portion of the above-referenced application is inconsistent with this application, this application supercedes the above-referenced application.

STATEMENT REGARDING FEDERALLY SPONSORED RESEARCH OR DEVELOPMENT

Not Applicable.

BACKGROUND

1. The Field of the Present Disclosure

The present disclosure relates generally to jacks, and more particularly, but not necessarily entirely, to a trailer tongue jack foot that is capable of retracting.

2. Description of Related Art

When a trailer is parked and detached from a tow vehicle, a support is required for the trailer tongue. Although other objects might be used, generally a special purpose jack (called a trailer jack or tongue jack) attached to the tongue is used. In addition, various types of vehicles, such as trailers and recreational vehicles (Rvs) use vehicle jacks for leveling the vehicle. Vehicle jacks generally are mounted vertically, or are pivotable to a vertical position, and have a telescoping portion (or inner tube) and a crank for upwardly and downwardly moving the telescoping portion. Such jacks provide static support, leveling, and facilitate detaching the tongue from the trailer hitch on the tow vehicle by allowing the tongue to be raised relative to the hitch, thereby disengaging the tongue from the hitch.

Devices for supporting trailer tongues are well known. U.S. Pat. No. 2,159,395 for "Trailer Control," describes a pivotable wheel assembly which may be cranked to a down position whereby the trailer tongue is supported. U.S. Pat. No. 2,638,315 for "Trailer Attached Jack," describes a simple telescoping jack for supporting a trailer tongue. U.S. Pat. No. 2,638,315 for "Trailer Attached Jack," describes a telescoping tongue jack similar to modern jacks. The jack of the '315 patent includes a crank for turning a screw shaft, which screw shaft is held in place by a thrust bearing, and cooperates with a nut attached to an inner telescoping tube to extend or retract the inner tube. U.S. Pat. No. 3,314,693 for "Retractable Trailer Tongue Jack," describes a jack having a screw shaft with a ring gear. A crank turns a pinion gear engaging the ring gear to turn the screw shaft, thereby extending or retracting an inner tube. U.S. Pat. No. 5,435,523 for "Trailer Tongue Jack," describes a tongue jack with a pair of cooperating beveled gears coupling a crank to a screw shaft.

One major disadvantage of the present tongue jacks is the time and effort required to fully raise and lower the tongue jack in order to hook up or unhook the trailer. For example, at times the jack is not long enough to reach the ground and lift the trailer to a sufficient height to enable the operator to hook up or unhook the trailer. Often times, the operator will employ "spacers" (e.g. blocks of wood, cinder blocks, etc.) to allow the jack to raise the trailer higher and/or to reduce the travel of the jack and thereby reduce the time and energy required to crank the jack all the up and down. In some cases, the operator may not fully retract the inner tube due to time constraints or apathy. However, towing a trailer with a jack that is not fully retracted may result in damage to the jack and trailer because the jack may hit the ground during transportation. In order to avoid this undesirable possibility, the operator is required to fully extend and retract the jack each time the operator hooks up or unhooks the trailer.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in this disclosure.

BRIEF DESCRIPTION OF THE DRAWINGS

The features and advantages of the disclosure will become apparent from a consideration of the subsequent detailed description presented in connection with the accompanying drawings in which:

FIG. 1 depicts a typical trailer attached to a tow vehicle;

FIG. 2 shows the trailer of FIG. 1 including a trailer tongue jack;

DETAILED DESCRIPTION

Figure 2A:
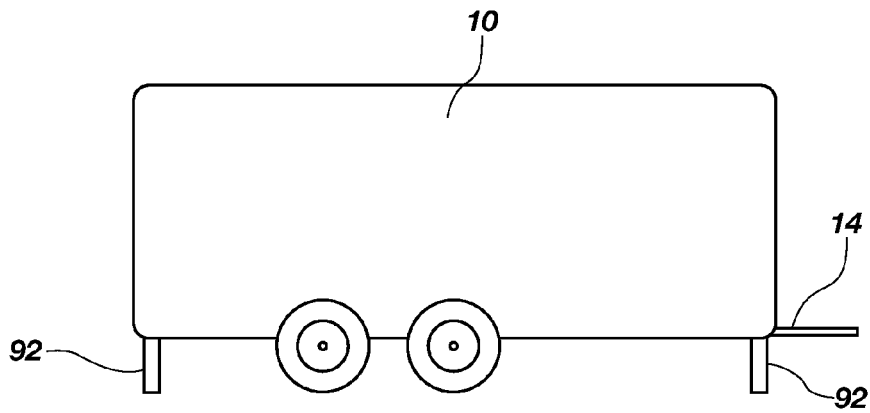
FIG. 2a shows a trailer including corner jacks.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present apparatus and methods for reducing the time and effort required to hook up and unhook trailers are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

It must be noted that, as used in this specification, the singular forms "a," "an," and "the" include plural referents unless the context clearly dictates otherwise.

In describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

As used herein, the term "proximal" shall refer broadly to the concept of a nearest portion.

As used herein, the term "distal" shall generally refer to the opposite of proximal, and thus to the concept of a further portion, or a furthest portion, depending upon the context.

As used herein, the phrase "in an at least partially proximal-to-distal direction" shall refer generally to a two-dimensional concept of direction in which the "proximal-to-distal" direction defines one direction or dimension. An item that extends in a non-parallel direction with respect to the "proximal-to-distal" direction, that is, at a non-straight angle thereto, thereby involves two components of direction, one of which is in the "proximal-to-distal" direction and the other being in a direction orthogonal to the "proximal-to-distal" direction.

The prior art is characterized by several disadvantages that are addressed by the present disclosure. The present disclosure minimizes, and in some aspects eliminates the above-mentioned problems by utilizing the methods and structural features described herein. For example, embodiments of the jack foot retraction system disclosed herein address the problems of the prior art by giving additional blocking to the bottom of the jack to reduce the cranking travel needed each time the jack is used, as well as eliminating the need to store commercial detachable jack feet, wood, cinder blocks, etc. Additionally, embodiments of the jack foot retraction system stay attached to the trailer tongue jack and fold out of the way to provide ground clearance during transportation.

Applicant has discovered that trailer hook up and unhook procedures are greatly enhanced by utilizing a device to reduce the time and effort required to hook up and unhook trailers from a tow vehicles. Applicant has thus conceived of an extendable/retractable jack foot device that is capable of providing stable support for a trailer while in the extended configuration and then folding up to provide better ground clearance in the retracted configuration to enable the trailer to be safely towed, while simultaneously reducing the time and effort required to hook up and unhook trailers from the tow vehicle.

Referring now to FIG. 1, a trailer 10 is shown connected to a tow vehicle 12 with trailer tongue 14 connected to trailer hitch 16 of the tow vehicle 12. The tongue 14 and hitch 16 combine to provide a connection for pulling the trailer 10, and vertical support for the tongue 14. The total weight transferred from the tongue 14 to the hitch 16 is called "tongue weight," and heavy trailers often have significant tongue weight. The trailer 10 is shown detached from the tow vehicle 14 in FIG. 2. A trailer tongue jack 17 is used to support the tongue weight. On some trailers 10, the trailer 10 includes one or more corner jacks 92. Corner jacks 92 are an additional form of vehicle jack that may be used to level or support the trailer 10. Collectively, trailer tongue jacks 17 and corner jacks 92 are referred to herein as vehicle jacks. A trailer 10 may have two corner jacks 92 at either rear corner of the trailer 10 that may work in conjunction with the trailer tongue jack 17 to level the trailer 10.

Figure 2B:
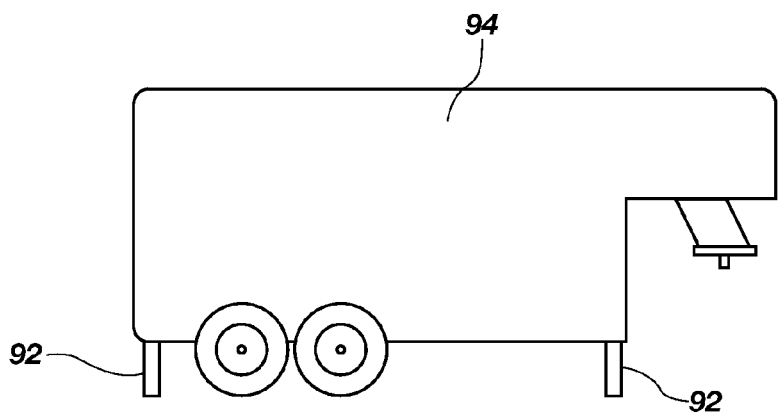
FIG. 2b shows a fifth-wheel trailer including corner jacks.
Figure 2C:
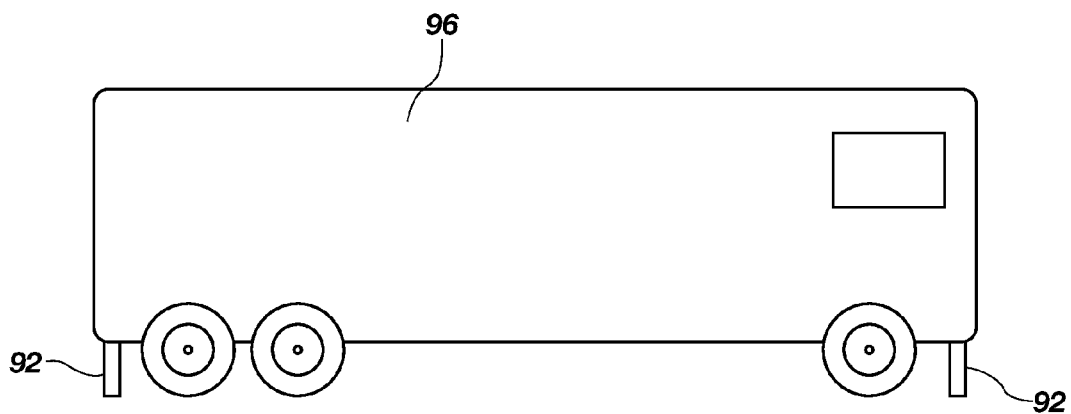
FIG. 2c shows a recreational vehicle with corner jacks.

FIG. 2a illustrates a trailer 10 having corner jacks 92 at each of the four corners of the trailer 10. The trailer 10 may be leveled by use of the four corner jacks 92. Similarly, FIG. 2b illustrates a fifth-wheel trailer 94 that includes four corner jacks 92. The corner jacks 92 may be used to level the fifth-wheel trailer 94. In addition, the two front corner jacks 92 may be used in hitching and un-hitching the fifth-wheel trailer 94 from a tow vehicle 12. FIG. 2c illustrates a recreational vehicle (RV) 96 with corner jacks 92. The RV 96 may include a corner jack 92 near each of the four corners of the RV 96 for leveling the RV 96.

Figures 3, 4:
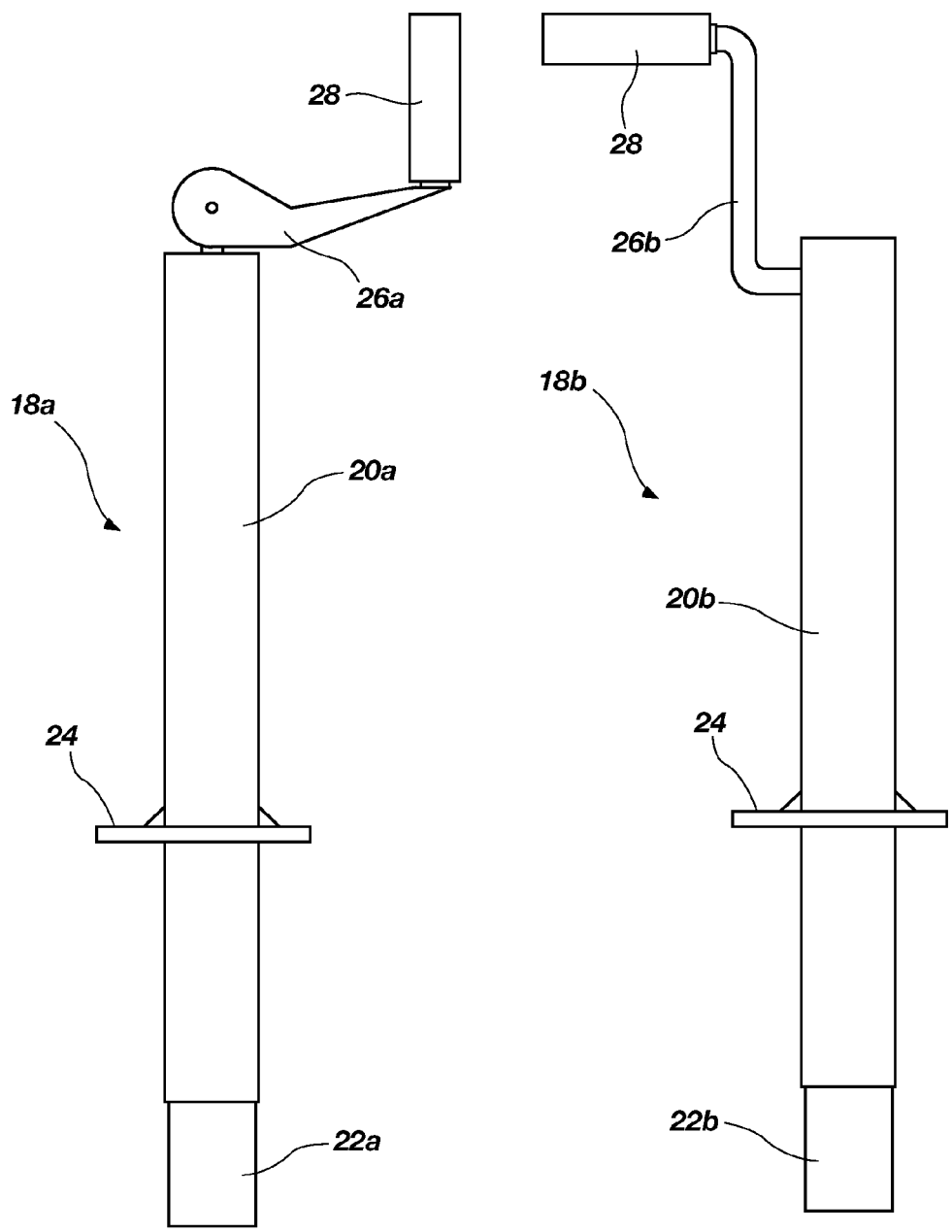
FIG. 3 illustrates one embodiment of a vehicle jack.
FIG. 4 illustrates another embodiment of a vehicle jack.

Two common types of vehicle jacks are shown in FIGS. 3 and 4. A first vehicle jack 18a with a first crank 26a attached to a top end of the first vehicle jack 18a is shown in FIG. 3. The first vehicle jack 18a includes a first outer tube 20a, a first inner tube 22a (also referred to herein as a moveable jack member), and a first crank 26a. The first outer tube 20a includes a flange 24 for mounting the first vehicle jack 18a to the tongue 14, and the first crank 26a includes a handle 28. A second vehicle jack 18b with a second crank 26b attached to a side of the second vehicle jack 18b near the top of the second outer tube 20b is shown in FIG. 4.

The two common types of vehicle jacks 18a and 18b, as shown in FIGS. 3 and 4, typically have a small, simple base (not shown) attached to the distal ends of the inner tubes 22a and 22b which contacts the ground and helps stabilize and support the trailer. Other types of vehicle jacks are also common. For example, vehicle jacks include electrically actuated screw jacks that include an electric motor and hydraulic jacks. As used herein, vehicle jack refers to any type of vehicle jack, including crank jacks, electric jacks, hydraulic jacks, trailer tongue jacks, and corner jacks.

Figure 5:
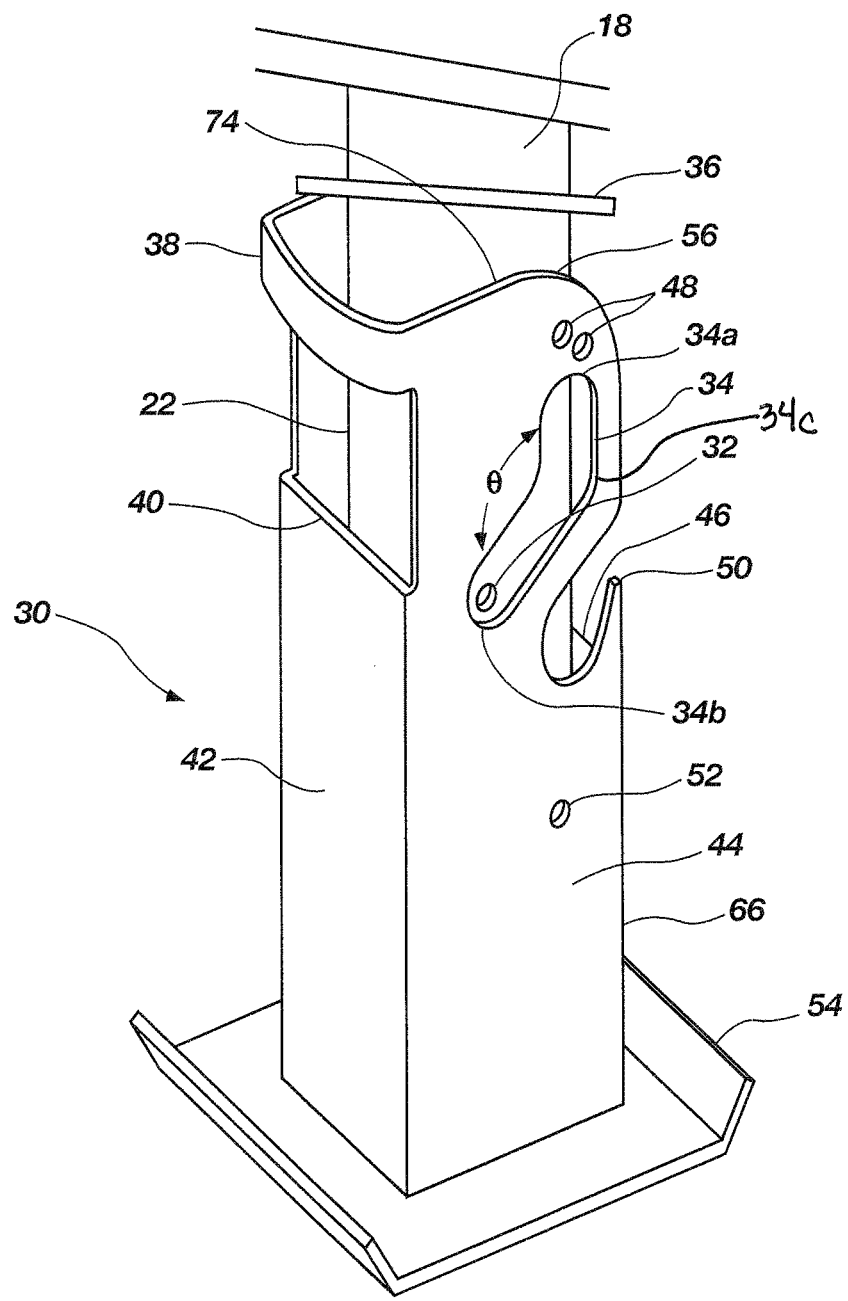
FIG. 5 is perspective view of one jack foot embodiment according to the present disclosure.

FIG. 5 shows one embodiment of a retractable/extendable jack foot 30 in accordance with the present disclosure. The jack foot 30 can be attached to a distal end of a telescoping inner tube 22 (similar to 22a and 22b in FIGS. 3 and 4) of a vehicle jack 18. It is to be understood that jack foot 30 may be used with any number of jacks and jack types that are not specifically shown in the present disclosure, including, but not limited to crank jacks, electric jacks, hydraulic jacks, trailer tongue jacks, corner jacks, jacks for installation on trailer tongues, trailer corners, RV corners, fifth wheel trailers, or other vehicles. The jack foot 30 supports the vehicle jack 18 in response to the jack foot 30 being in a lowered position, the vehicle jack 18 being extended, and the jack foot 30 being loaded.

The jack foot 30, in some embodiments, can be attached to the inner tube 22 by inserting the inner tube 22 into the jack foot 30, aligning the shaft hole 32 in the inner tube 22 with a shaft slot 34, which may also be referred to as a shaft slot window 34, and inserting a shaft (not shown) through the shaft slot window 34 into the shaft hole 32 to secure the jack foot 30 to the inner tube 22. In some embodiments, the shaft hole 32 extends all the way through the inner tube 22 and there is a another shaft slot window on a second lateral side of jack foot 30 (not shown), similar to the shaft slot window 34 on a lateral side 44 of the jack foot 30, such that the shaft can extend all the way through the jack foot 30 and the inner tube 22 and be secured on the second lateral side of the jack foot 30 with a fastener (not shown), such as a nut, a pin, a rivet, or other securing device. The lateral side 44 may also be described as a lateral side wall.

The shaft slot window 34 may have a substantially straight proximal section terminating in a proximal end 34a, and a substantially straight distal section terminating in a distal end 34b, the proximal section and the distal section intersecting at intersection 34c and forming an angle θ as shown in FIG. 5, which could be an obtuse angle, such as 135 degrees or any suitable angle within a range of 95 degrees to 175 degrees, and said shaft slot window 34 is therefore non-linear. The shaft slot window 34 resides in the upper proximal third of a jack foot body of the jack foot 30, as shown in FIG. 5 and elsewhere in the drawings.

In one embodiment, the jack foot 30 can also have a pilot hole 52 to help facilitate proper alignment and attachment of the jack foot 30 to the inner tube 22 by measuring the proper distance between the resting plate 46 and the center of the shaft hole 32 and allowing the operator to drill a pilot hole at the proper distance. The pilot hole 52, in one embodiment, is positioned a pre-determined distance from the front side 42 of the jack foot 30. The front side 42 may also be described as a front side wall, such that the front side 42 resides between and intercouples the two opposing lateral side walls 44 to thereby form a three-sided jack foot body having a distal end 45 connected to the base 54, as shown most clearly in FIG. 6, the three-sided jack foot body thereby having three sidewalls and an open side as shown most clearly in FIGS. 5 and 7. As also shown most clearly in FIG. 6, the base 54 is wider in all directions than, and thereby surrounds the perimeter of, the distal end 45 of the jack foot body. The pre-determined distance may correspond to the distance between the resting plate 36 and the proper position for the center of the shaft hole 32. The proper position for drilling the shaft hole 32 can be determined by positioning the jack foot 30 over the end of inner tube 22 such that the distal end of the inner tube 22 contacts the front side 42 of the jack foot 30, and drilling pilot holes in the inner tube 22, then removing the jack foot 30 and drilling the pilot holes to the correct diameter for the shaft hole 32 to receive a shaft (not shown).

Figure 7:
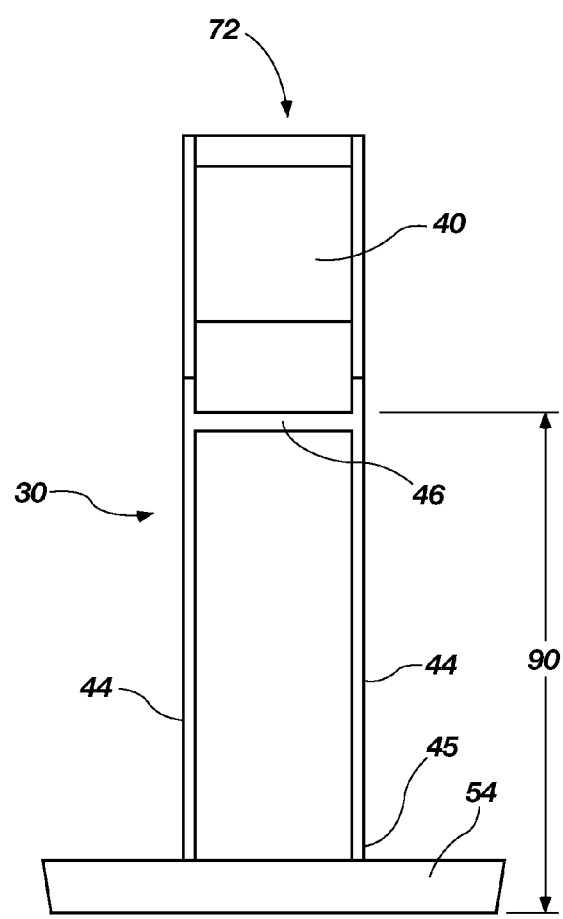
FIG. 7 is a rear view of the jack foot of FIG. 5.
Figure 8:
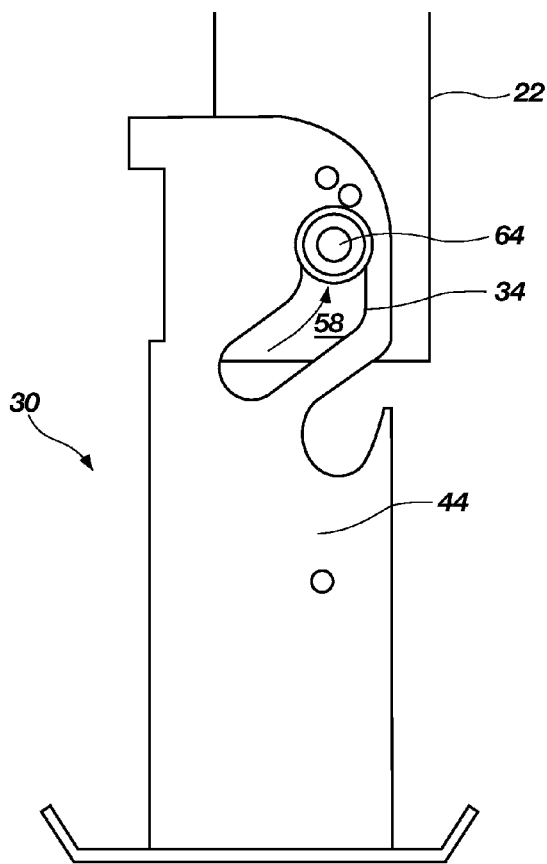
FIG. 8 is a side view of the jack foot of FIG. 5.

Referring now to FIGS. 7-8, it is to be understood that the sidewall 44 shown in FIG. 8 can be identical to its opposing sidewall 44 (not shown in FIG. 8), such that shaft 64 is disposed within and extends between the first shaft slot window 34 and an opposing second shaft slot window (not shown in FIG. 8 but which is in the opposing lateral sidewall 44 in mirror-image alignment with the first shaft slot window 34) and wherein the moveable jack member 22 resides between the first lateral sidewall 44 and the second lateral sidewall 44, such that said shaft 64 extends from the first shaft slot window 34 in the first lateral sidewall 44 through said moveable jack member 22 and into the second shaft slot window in the second lateral sidewall 44.

Referring back now to FIG. 5, the shaft hole 32, in some embodiments, is ½ inch diameter hole has drilled near the distal end of the vehicle jack 18 in order to mount the jack foot 30. The pilot hole 52 may be used to measure and drill the shaft hole 32 in a round tube or a square tube at the distal end of the vehicle jack 18.

In order to assist an installer in locating and drilling the shaft hole 32 in the right location, the pilot hole 52 may be a 3/16 inch hole on a lateral side 44 of the jack foot 30. In one embodiment, the pilot hole 52 is located down from the support plate half the distance of an inner width of the jack foot 30. This way the pilot hole 52 is located at approximately the center of an inner tube 22 of a vehicle jack 18.

The jack foot 30, in one embodiment, has an inner width that corresponds to a width of the inner tube 22 of the vehicle jack 18. In some embodiments, the jack foot 30 is available in different widths, in order to accommodate vehicle jacks with different diameter tubing. The pilot hole 52 may be located in a downward direction from the resting plate 46 by half the inner width of the jack foot 30. By positioning the pilot hole 52 in this manner, the pilot hole 52 is positioned correctly near the center of the appropriate diameter tube.

The pilot hole 52 also allows the shaft hole 32 to be positioned vertically at a specific position. In one embodiment, the pilot hole 52 is positioned one and one half inches from the front surface 42 of the jack foot 30, and thus positions the shaft hole 32 one and one half inches up from the bottom of the inner tube 22. Proper position of the shaft hole 32 may allow proper interaction of the cam surface 56 with the striker plate 36 and allow the distal end of the inner tube 22 to rest on the resting plate 46 when the jack foot 30 is being used.

In one embodiment, a striker plate 36 is placed between the jack foot 30 and the proximal end of the vehicle jack 18. In other embodiments, (e.g. square shaped inner tubes 22), a striker plate 36 may not be needed or may be an existing portion of the vehicle jack 18, trailer hitch 16, trailer tongue 14, trailer 10, fifth wheel trailer 94, RV 96, or other vehicle. In other words, the striker plate 36 may be an existing portion of the vehicle jack 18, trailer hitch 16, trailer tongue 14, trailer 10, fifth wheel trailer 94, RV 96, or other vehicle.

In one embodiment, the striker plate 36 is free floating and can move about the inner tube 22 for ease of manufacture and installation. However, the striker plate 36 can also be attached to the outer tube (not shown) or other stationary body via welding, adhesives, molding, by tabs on the striker plate 36 allowing it to be mounted (e.g. screwed) to the outer tube or stationary body, or by any other means of attachment well known to those skilled in the art.

The striker plate 36, in some embodiments, is shaped like a circular O-ring or washer. However, the striker plate 36 can also be square-shaped or any other suitable shape and still operate for purposes of the present disclosure. The striker plate 36 can be made of various materials, including, but not limited to: steel, nylon, plastic, polyurethane, etc. and/or combinations thereof. The striker plate 36 may have an inner diameter (or shape) that is larger than the inner tube 22 and smaller than the outer tube. Furthermore, the striker plate 36 may have an outer diameter (or shape) that is sufficiently large to provide substantial contact with the top of the jack foot 30. Details of the operation of the striker plate 36 will be discussed in further detail below.

In some embodiments, the jack foot 30 may also have a U-shaped stabilizer 38 shaped to conform to the shape of the inner tube 22 to help stabilize the inner tube 22 within the jack foot 30 when the jack foot 30 is in the extended position. However, the stabilizer 38 can also assume other shapes to interact with the inner tube 22 to help stabilize the inner tube 22 within the jack foot 30 when the jack foot 30 is in the extended position. The stabilizer 38 can also help lock the jack foot 30 in the extended position and keep it from collapsing if the vehicle rolls forward or backwards. Furthermore, the interior channel (not shown) of the jack foot 30 can also assume a U-shape or any other shape to interact with the inner tube 22 so as to stabilize the inner tube 22 within the jack foot 30 when the jack foot 30 is in the extended position. For example, the interior channel of the jack foot 30 can be shaped to work with round or square jack inner tubes 22.

The interior channel of the jack foot 30 can also have a resting plate 46 to contact, support, and stabilize the inner tube 22 in the extended position and, in some embodiments, bear all or substantially all of the load of the vehicle transmitted to the resting plate 46 through the inner tube 22. However, in other embodiments, the load of the vehicle transmitted through the inner tube 22 may be borne by the jack foot 30 through the shaft (not shown) bearing on the bottom surface of the shaft slot window 34.

Additionally, the jack foot 30 can also have a base 54 to help stabilize the vehicle jack 18 and the vehicle. In one embodiment, the front and back sides of base 54 are bent or curved upward to help facilitate the retracting and extending motion of the jack foot 30, as will be discussed in further detail below.

Continuing with FIG. 5, The top of the front side 42 of the jack foot 30 can also have an inner tube window 40 cut into, or otherwise formed in, the front side 42 of the jack foot 30 for receiving the distal end of inner tube 22 in the retracted position to allow the jack foot 30 to rotate without catching or jamming on the end of inner tube 22 (discussed in more detail below). The jack foot 30 may also have retaining pin holes 48 to help hold the jack foot 30 in the retracted position by inserting a retaining pin (not shown) through the retaining pin holes 48. The retaining pin holes can be located above or below the shaft slot window 34.

The jack foot 30 may also have cut out slot 50 designed for minimal interference with trailer tongues in the retracted position. The jack foot 30 may also have a curved cam surface 56 to help facilitate the retracting and extending motion of jack foot 30.

The jack foot 30, in some embodiments, has a proximal end 74. In one embodiment, the proximal end 74 is a portion of the jack foot 30 that first contacts the striker plate 36 as the vehicle jack 18 is moved from a lowered to a raised position when the jack foot 30 is in an extended position. In certain embodiments, the jack foot 30 has a back side 66. In one embodiment, the back side 66 is a portion of the jack foot 30 that contacts the striker plate 36 when the vehicle jack 18 is in a fully raised position.

The jack foot 30 may be constructed using any material capable of performing the described functions of the jack foot 30 and also capable of supporting the tongue weight of a trailer 10 or the weight of a portion of another type of vehicle. For example, the jack foot 30 may be constructed using steel, aluminum, a composite material, an alloy, a combination of the above-listed materials, or another material.

Figure 6:
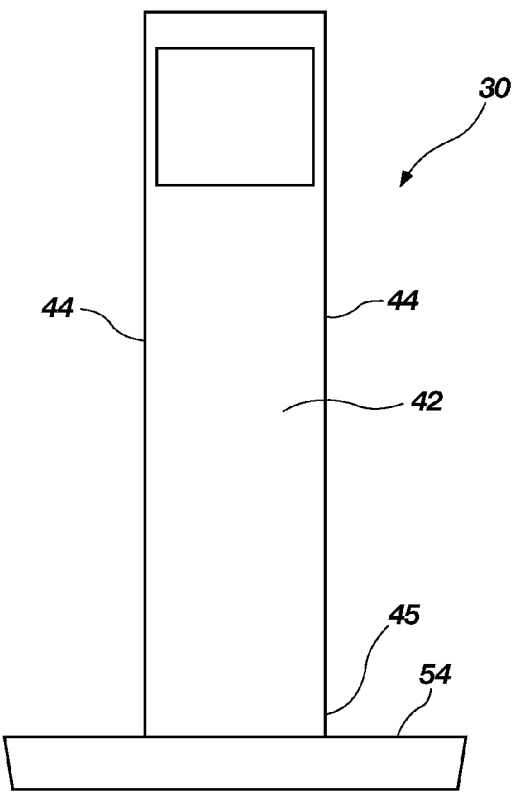
FIG. 6 is a front view of the jack foot of FIG. 5.

FIG. 6 shows a view of the front side 42 of the jack foot 30 shown in FIG. 5 and unattached to the inner tube 22 of the vehicle jack 18. FIG. 6 shows a front side view of base 54 and inner tube window 40.

FIG. 7 illustrates a view of the back side 42 of the jack foot 30 shown in FIG. 5 and unattached to the inner tube of the jack. FIG. 7 also shows a back side view of the base 54, the inner tube window 40, and the resting plate 46. In one embodiment, the back side of the jack foot 30 is at least partially open forming an interior channel 72 for receiving the inner tube 22. In some embodiments, the back side 66 of the jack foot 30 is enclosed by a surface of the jack foot 30 below the resting plate 46.

In certain embodiments, the resting plate 46 is positioned on the jack foot 30 such that a top surface of the resting plate 46 is a pre-determined extension length 90 from a bottom of the base 54. The extension length 90 is the amount of extension provided by the jack foot 30 when the jack foot 30 is extended and loaded. In other words, the jack foot 30, installed and in use with the vehicle jack 18, extends the effective height of the vehicle jack by the extension length 90. The extension length 90 may be any length by which the effective height of the vehicle jack 18 is to be extended. For example, the extension length 90 may be a length between three and nine inches. In some embodiments, the jack foot 30 may be available in varying extension lengths 90, such as a four inch extension length 90, a six inch extension length 90, and an eight inch extension length 90. The extension length 90, in some embodiments, is adjustable. For example, the resting plate 46 may be removable and attachable on the jack foot 30 at varying positions.

FIGS. 8-12 illustrate the retracting and extending motions of the jack foot 30 in accordance with the present disclosure. The jack foot 30, in one embodiment, is designed to automatically rotate upward as the inner tube 22 of the vehicle jack 18 is retracted up into the outer tube 20. As will be seen, the automatic retraction or rotation of the jack foot 30 can be obtained by the specific design and interaction between the cam surface 56, the striker plate 36 and the location of the top of the shaft slot window 34. However, it is to be understood that manual rotation may also be used without departing from the spirit or scope of this disclosure. For example, the operator can manually rotate the jack foot 30 and use a retaining pin (not shown) and retaining pin holes 48 to lock the jack foot 30 in a retracted position.

FIG. 8 shows the first stages of jack foot 30 retraction with the inner tube 22 rising such that a shaft 64 also rises and travels the path of shaft slot window 34, indicated by arrow 58, until the shaft 64 reaches the proximal end of the shaft slot window 34. The shaft 64 travels the path 58 of the shaft slot window 34 in response to the jack foot 30 becoming unloaded. As load is removed from the jack foot 30 in response to the vehicle jack 18 being retracted, the weight of the jack foot 30 causes the jack foot 30 to remain resting on the ground as the vehicle jack 18 is retracted the vertical length of the shaft slot window 34. Under the influence of gravity, the shaft 64 travels from the distal end of the shaft slot window 34 to the proximal end of the shaft slot window 34 during an initial phase of retraction of the vehicle jack 18.

Figure 8A:
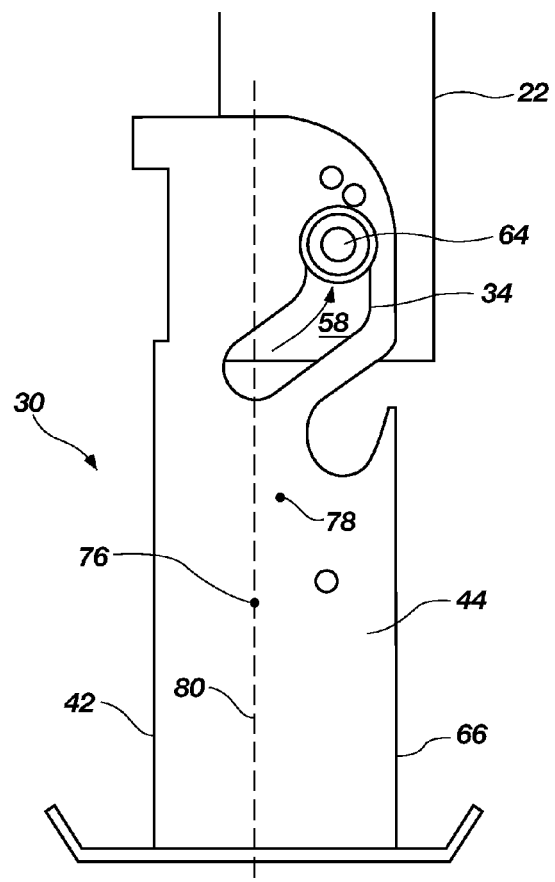
FIG. 8a is a side view of the jack foot of FIG. 5 and illustrates aspects of the jack foot relating to physical properties of the jack foot.

FIG. 8a shows one embodiment of the jack foot 30 and illustrates aspects of the jack foot 30 relating to physical properties of the jack foot 30. The jack foot 30 includes a center of mass 76, a geometric center 78 of the lateral side 44, and a vertical mass axis 80.

The center of mass 76 of the jack foot 30 is a point defined by the average location of all of the mass of the jack foot 30. In some embodiments, the center of mass 76, as viewed from a lateral side (as shown in FIG. 8a) is located closer to the front side 42 of the jack foot 30 than the back side 66 of the jack foot 30. In some embodiments, the center of mass 76, as viewed from a lateral side (as shown in FIG. 8a) is located closer to the front side 42 of the jack foot 30 than is the geometric center 78 of the lateral side 44 of the jack foot 30.

The geometric center 78 of the lateral side 44 is a point defined by the average position of all of the points of the lateral side 44. The geometric center 78 is, in essence, the middle point of the lateral surface 44. In some embodiments, the geometric center 78 is roughly equidistant from the front side 42 and the back side 66 of the jack foot 30.

In one embodiment, the vertical mass axis 80 is an imaginary line drawn through the center of mass 76 and extending in a vertical direction when the jack foot 30 is in a lowered position, as illustrated in FIG. 8*a*. Notably, if the jack foot 30 is supported at a point above the center of mass 76 and on the vertical mass axis 80, the jack foot 30 will tend to orient itself in the lowered position as illustrated in FIG. 8*a*.

As illustrated in FIG. 8*a*, the shaft 64 may move to a proximal end of the shaft slot window 34 as the vehicle jack 18 is retracted. In some embodiments, the proximal end of the shaft slot window 34 is located between the vertical mass axis 80 and the back side 66 of the jack foot 30. In response to the vehicle jack 18 being retracted to a point that the jack foot 30 is no longer supported by the ground and is supported by the shaft 64, the jack foot 30 may rotate so that the center of mass 76 is located directly below the shaft 64. This initial rotation of the jack foot 30 may help facilitate subsequent rotation of the jack foot 30 by the cam surface 56 and the striker plate 36.

Figure 8B:
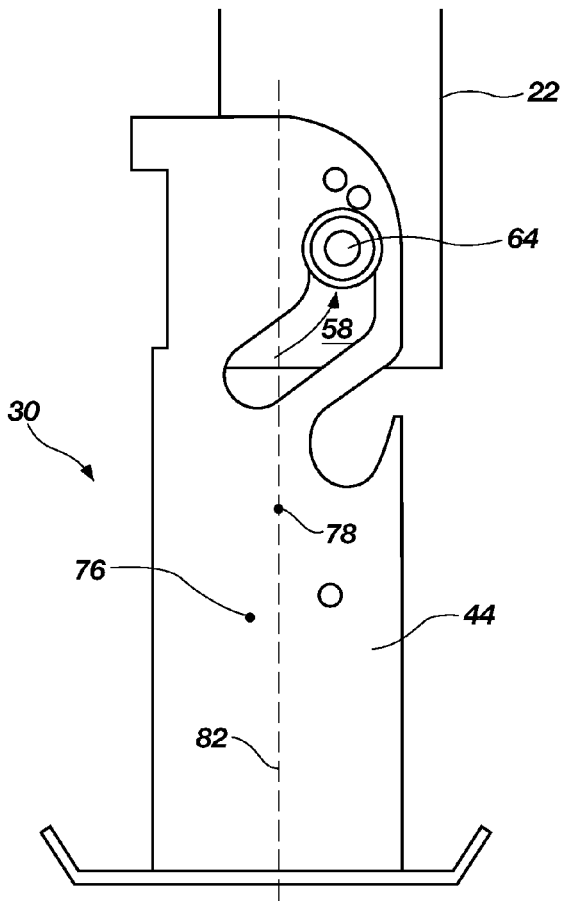
FIG. 8b is a side view of the jack foot of FIG. 5 and illustrates geometric properties of the jack foot.

FIG. 8*b* illustrates one embodiment of the jack foot 30 and shows geometric properties of the jack foot 30. The jack foot includes a center of mass 76, a geometric center 78 of the lateral side 44, and a vertical center axis 82. The center of mass 76 and the geometric center 78 of the lateral side 44 are substantially similar to same-numbered components described in relation to FIG. 8*a*.

The vertical center axis 82, in one embodiment, is an imaginary line drawn through the geometric center 78 of the lateral side 44 and extending in a vertical direction when the jack foot 30 is in a lowered position, as illustrated in FIG. 8*b*. In some embodiments, the vertical center axis 82 is located nearer or more distant from the front side than is the vertical mass axis 80 when viewed from the lateral side 44. In one embodiment, the vertical center axis 82 is located the same distance from the front side 42 as is the vertical mass axis 80 when viewed from the lateral side 44.

Figure 8C:
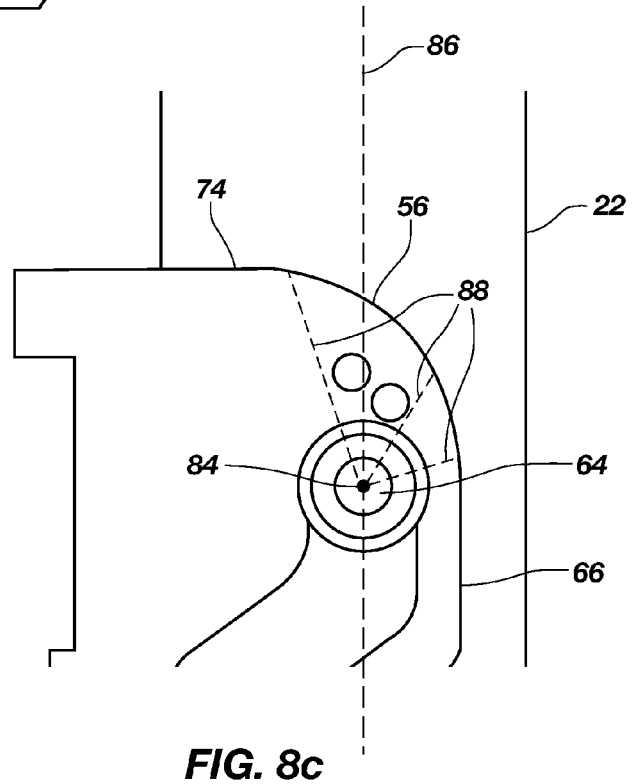
FIG. 8c is a side view of the jack foot of FIG. 5 and illustrates the cam surface.

FIG. 8*c* illustrates one embodiment of a jack foot 30 showing the cam surface 56. The jack foot 30 includes a proximal end 74, a cam surface 56, a back surface 66, and a shaft 64 having shaft axis 84, which may also be referred to as a rotation axis 84. The proximal end 74, cam surface 56, back surface 66, and shaft axis 84 are substantially similar to same-numbered components described in relation to FIG. 5.

The cam surface 56, in one embodiment, is a curved surface that interacts with the striker plate 36 to cause the jack foot 30 to rotate from a lowered position to a raised position in response to the vehicle jack 18 moving from an extended position to a retracted position, and the striker plate 36 may therefore be referred to as jack foot motion-path-altering member. In one embodiment, the cam surface 56 runs from the proximal end 74 of the jack foot 30 to the back surface 66 of the jack foot. The proximal end 74, the cam surface 56, and the back surface 66 may be described as an edge of the jack foot 30.

In some embodiments, the jack foot 30 rotates around a rotation axis 84 as it moves from a lowered position to a raised position. The rotation axis 84, in one embodiment, is positioned at the center of the shaft 64 when the shaft is located at the proximal end of the shaft slot window 34, as depicted in FIG. 8*c*. The rotation axis 84, in some embodiments, is substantially perpendicular to a long axis 86 of the vehicle jack 18. The long axis 86 of the vehicle jack 18 may be defined as an axis running along the inner tube 22 of the vehicle jack 18. As depicted in FIG. 8*c*, the rotation axis 84 extends substantially into and out of the page.

The cam surface 56, in one embodiment, terminates at a radius 88 from the rotation axis 84 of the jack foot 30. The cam surface 56 may include a curve defining multiple radii 88 extending between the rotation axis 84 and the cam surface 56 or edge of the jack foot 30. The radii 88 may vary over the cam surface 56. In certain embodiments, the radii 88 decrease as the cam surface 56 runs from the proximal end 74 to the back surface 66. The decreasing radii 88 of the cam surface 56 interact with the striker plate 36 to cause the jack foot 30 to rotate to a raised position as the vehicle jack 18 is retracted, and to rotate to a lowered position as the vehicle jack 18 is extended.

The radius 88 may decrease at a constant rate as the cam surface 56 runs from the proximal end 74 to the back surface 66. For example, the radius 88 may decrease by a constant amount per degree of rotation of the jack foot 30. In some embodiments, the radius 88 decreases at a constant rate over a portion of the cam surface 56. The radius 88 of the cam surface 56, in some embodiments, decreases at a varying rate over a portion or all of the cam surface 56.

Figure 8D:
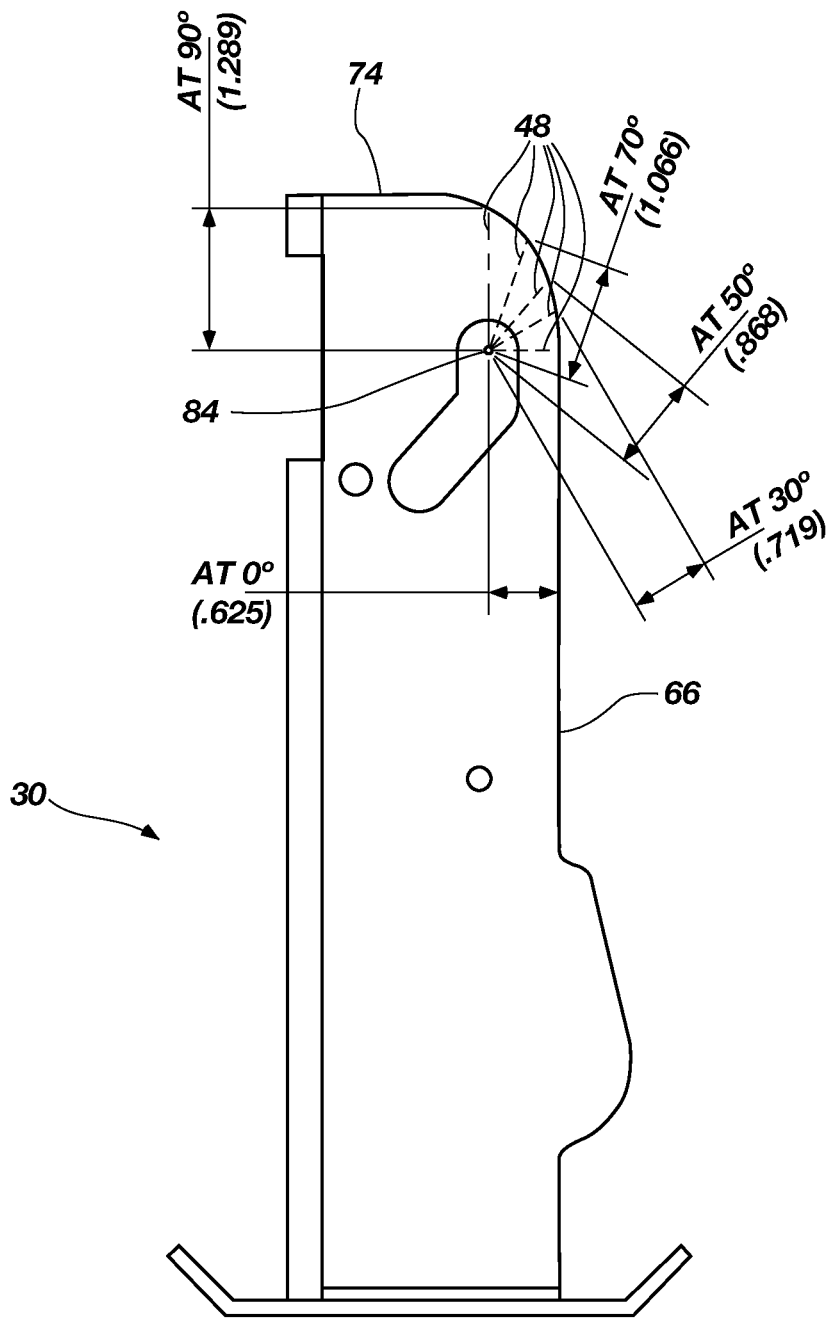
FIG. 8d is a side view of one jack foot embodiment illustrating the cam surface.

FIG. 8*d* is a side view of one jack foot 30 embodiment illustrating the cam surface 56. The jack foot 30 includes a rotation axis 84 and a varying cam radius 88. The varying radius 88 decreases as the cam surface 56 runs from the proximal end 74 to the back side 66. For illustrative purposes, the radius 88 may be measured at varying angles from an imaginary angle measurement line drawn through the rotation axis 84 and running horizontally when the jack foot 30 is in the extended position. In one embodiment, the radius 88 is approximately 1.289 inches at 90 degrees from the angle measurement line, approximately 1.066 inches at 70 degrees from the angle measurement line, approximately 0.868 inches at 30 degrees from the angle measurement line, approximately 0.719 inches at 30 degrees from the angle measurement line, and approximately 0.625 inches at 0 degrees from the angle measurement line.

Figure 9:
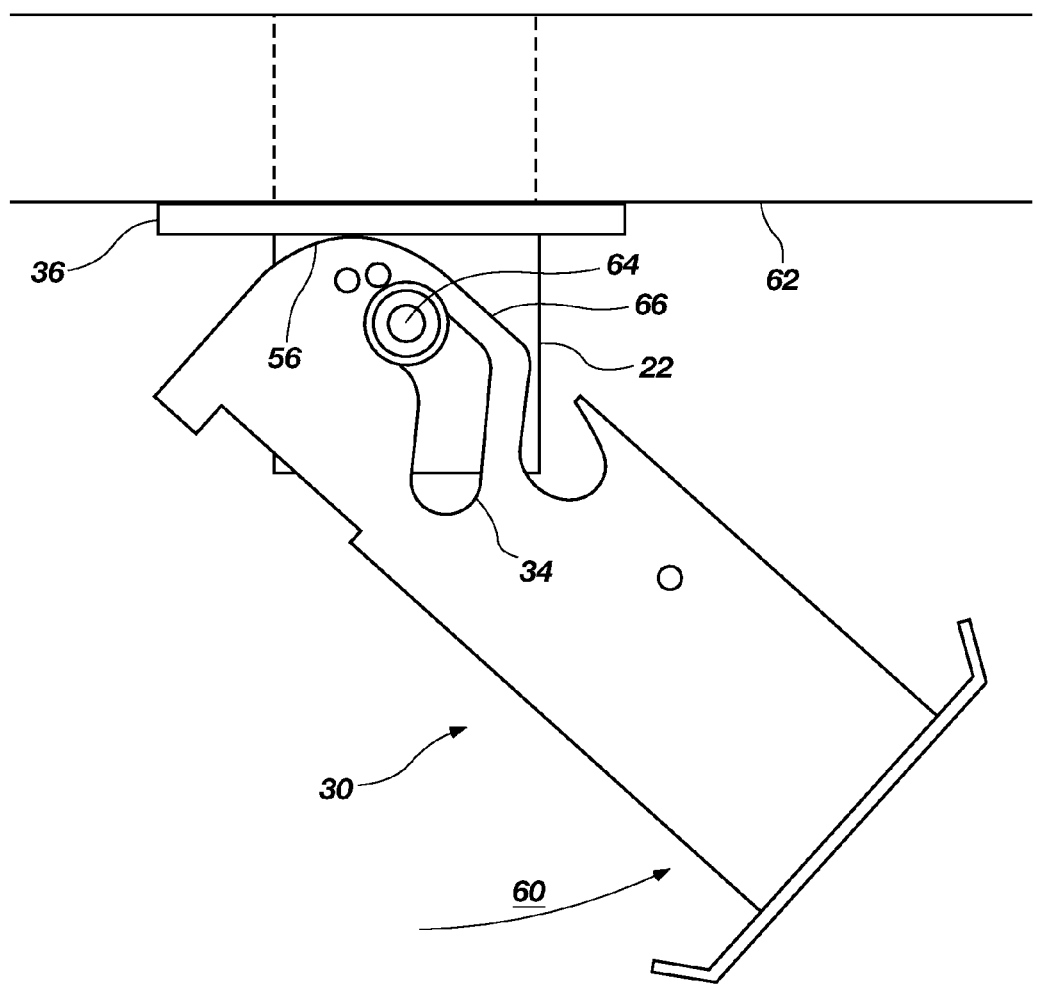
FIG. 9 illustrates the retracting motion of the jack foot of FIG. 5.

Referring now to FIG. 9, as the inner tube 22 continues to rise, the jack can be lifted off the ground and begin to rotate counterclockwise in the direction of arrow 60, due to gravity as described above in relation to FIG. 8*a*. With increasing retraction of the inner tube 22, the jack foot 30 continues to rise until the striker plate 36 (if used) comes into contact with a rigid body (such as the trailer tongue 62 or outer tube 20 of the vehicle jack 18, if the striker plate 36 is free-floating), and the top of the cam surface 56 comes into contact with the striker plate 36. A striker plate 36 that is positioned in a manner that causes the cam surface 56 to contact the striker plate 36 as the vehicle jack 18 is retracted can be said to be "aligned" with the cam surface 56. The cam surface 56 is positioned on the jack foot 30 such that it is adapted to interact with the striker plate 36. The interaction between the cam surface 56 and the striker plate 36 may cause the jack foot 30 to rotate in response to movement of the vehicle jack 18 from a lowered position to a raised position.

At this point, the shaft 64 is positioned lower and to the rear of the point of contact between the top of the cam surface 56 and the striker plate 36, such that the shaft 64 is closer to the back surface 66 of jack foot 30. As the inner tube 22 continues to rise, the shaft 64 in the slot 34 continues to rise and the jack foot 30 retracts further and rotates such that the distal end of the jack foot 30 moves backwards and upward, as illustrated by the direction of arrow 60, due to shape of the cam surface 56 in relation to the position of the shaft 64 and the slot 34. This backward and upward rotation continues until the jack foot 30 is fully retracted, preferably in a substantially horizontal position (see FIG. 10), or the jack foot 30 is retracted far enough to not impede transportation or movement of the trailer 10, fifth wheel trailer 94, RV 96, or other vehicle. It will be appreciated that while the description above refers to the jack foot 30 rotating upward and backward, the jack foot 30 may be designed to move an any direction that creates additional clearance between the jack foot 30 and the ground. For example, the jack foot 30 may be configured to rotate upward and frontward or upward and to a lateral side as the vehicle jack 18 is retracted.

Figure 10:
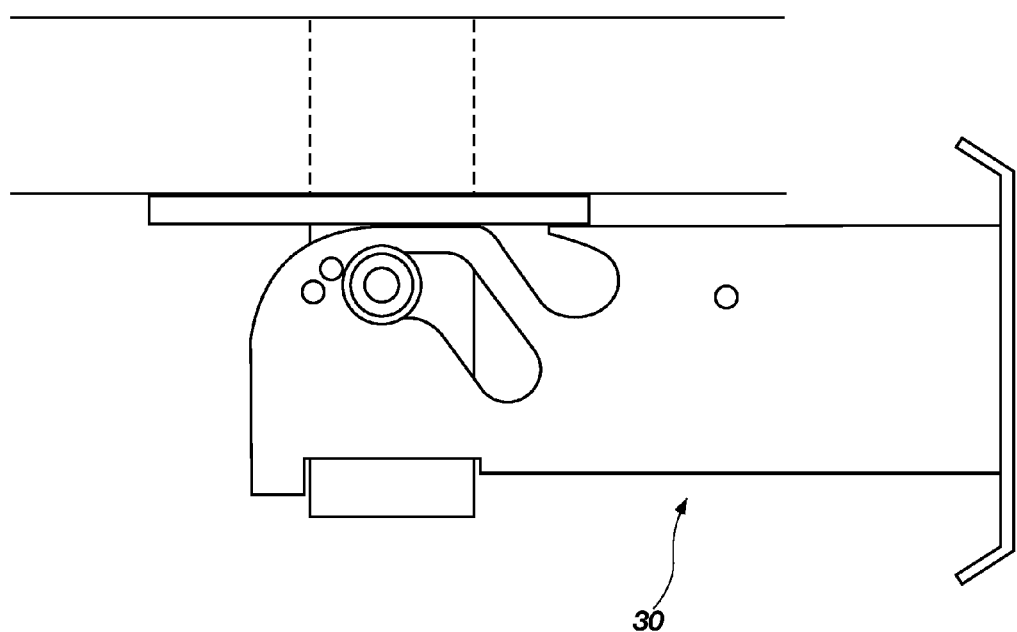
FIG. 10 illustrates the fully retracted position of the jack foot of FIG. 5.
Figure 11:
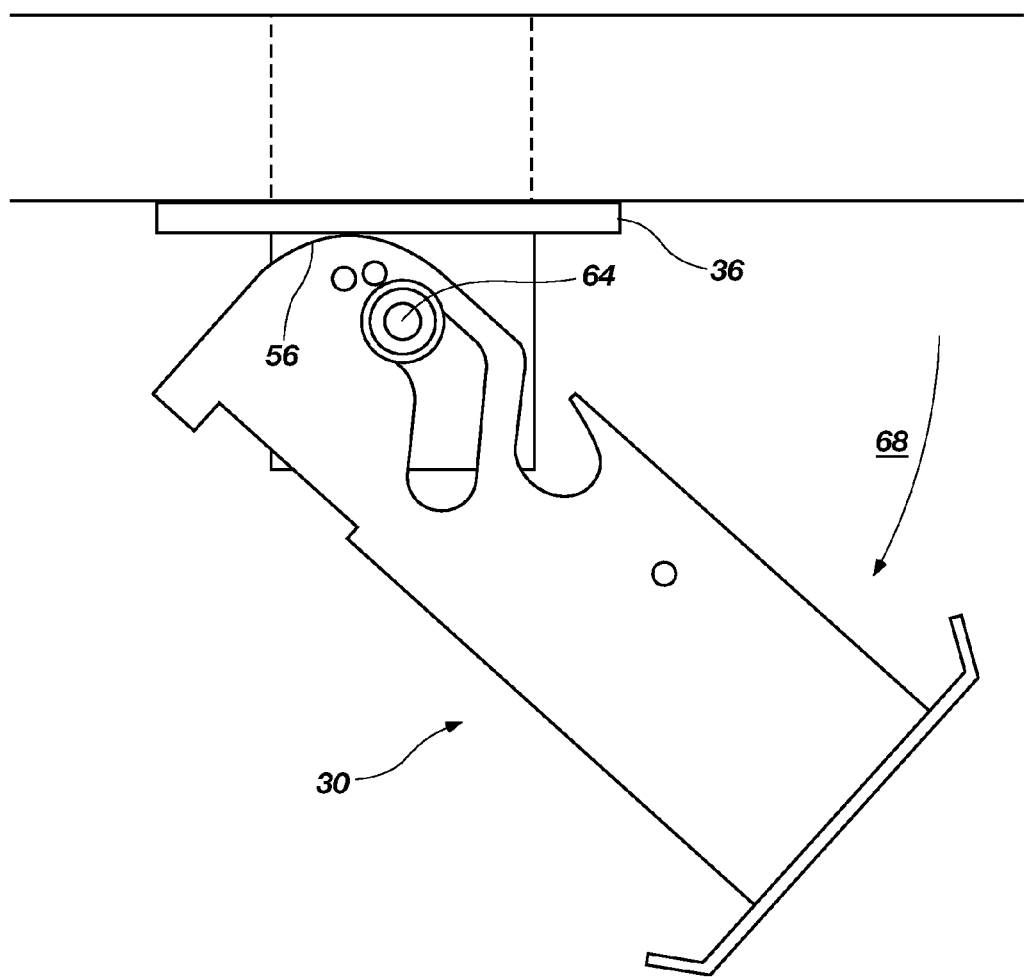
FIG. 11 shows the extending motion of the jack foot of FIG. 5.
Figure 12:
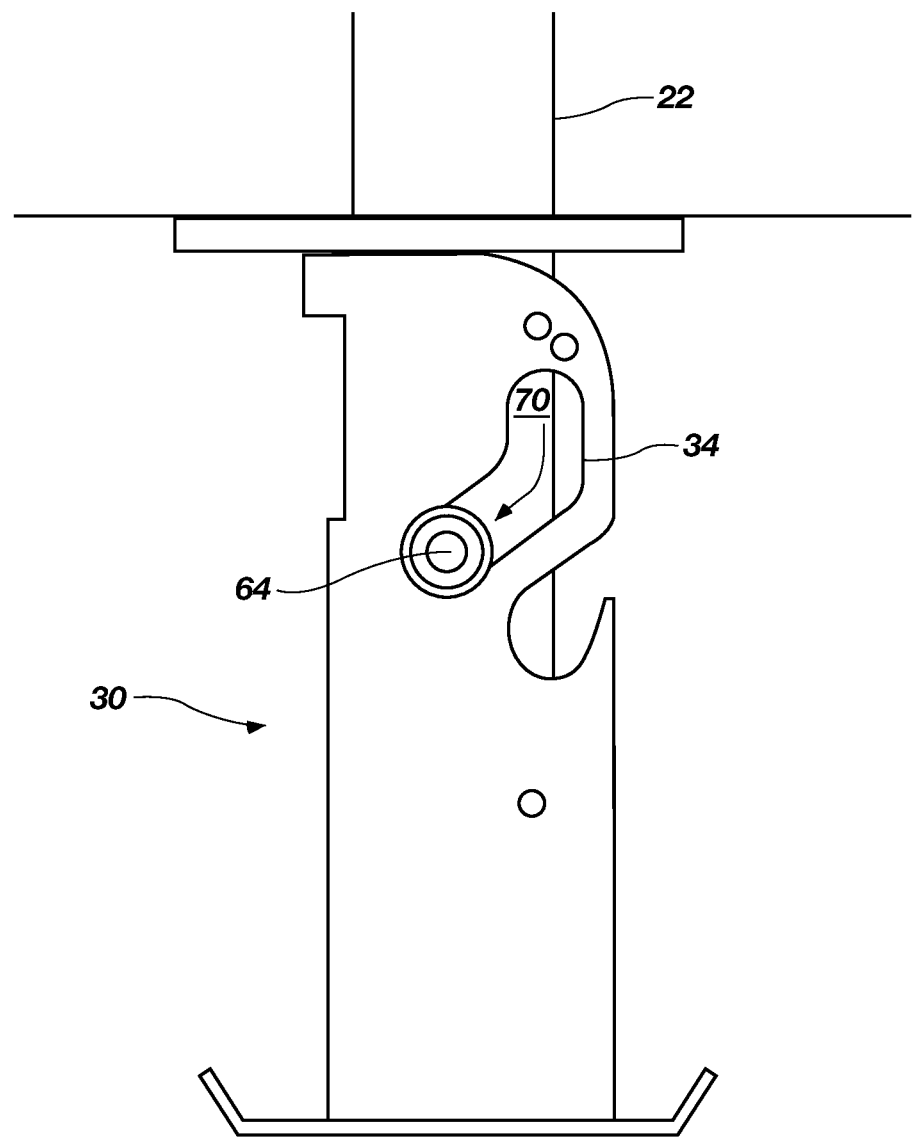
FIG. 12 depicts the fully extended and locked position of the jack foot of FIG. 5.

FIGS. 10-12 illustrate the extension of jack foot 30 from the retracted position to the fully extended position. FIG. 10 shows the jack foot 30 fully retracted. As the inner tube 22 is extended, the jack foot 30 rotates in a downward and frontward direction as indicated by arrow 68 due to gravity overcoming the reduced frictional forces imposed by shaft 64 on cam surface 56 which is in contact with striker plate 36.

The curvature of cam surface 56 can be any size and shape and can vary over the entire surface of the cam 56. The curvature of cam surface 56 can be such that it forms part of a circle, osculating circle, ellipsoid, oblate ellipsoid or other curved shape, including non-curved shaped composed of straight or substantially straight lines. In one embodiment, the cam surface 56 is smooth and curved to minimize frictional forces between the striker plate 36 and the cam surface 56 during retraction and extension. In a one embodiment, the distance between the shaft 64 and the cam surface 56 decreases moving from the top of the cam surface 56 (closer to the front surface 42 of jack foot 30) to the bottom of the cam surface 56 on the back side 66 of jack foot 30 to help impart a rotational force on jack foot 30.

With reference to FIG. 12, the jack foot 30, in one embodiment, is designed to automatically lock into an extended position as the inner tube 22 of the vehicle jack 18 is further extended. The automatic locking of jack foot 30 into the extended position can be obtained by the specific design and interaction between the shape of the shaft slot window 34, the position of shaft 64, the shape of the interior channel 72 of the jack foot 30 and the position of the resting plate 46 inside of the interior channel 72.

As the vehicle jack 18 is extended, the jack foot 30 rotates clockwise and contacts the ground. As the load on the vehicle jack 18 increases, the shaft 64 follows the path of the shaft slot window 34 downward until it substantially reaches the distal end of shaft slot window 34. The jack foot 30 with the shaft 64 positioned at the distal end of the shaft slot window 34 is said to be "loaded," while the jack foot with the shaft 64 positioned at the proximal end of the shaft slot window 34 is said to be "unloaded." Additionally, the jack foot 30 may slightly move rearward due to the force imposed upon the edges of slot 34 by shaft 64, until the jack foot 30 reaches the fully extended position. In the fully extended position, the distal end of the inner tube 22 may contact the resting plate 46 and bear all or substantially all of the trailer tongue weight and, at the same time, one or more sides of the inner tube 22 may contact one or more sides of the inner channel 72 (and/or u-shaped stabilizer 38) of the jack foot 30 to help stabilize the inner tube 22 within the jack foot 30. In this manner, the size, shape, and position of the shaft slot window 34 allows the jack foot 30 to lock into place in the up or down position.

In some embodiments, the shaft slot window 34 is also designed to lock the jack foot 30 from collapsing if the trailer rolls forward. Additionally, the shape of the shaft slot window 34 can vary, but the starting and ending points of the shaft slot window 34 may be the same or substantially similar. For example, the shape of the shaft slot window 34 can be dog-legged, v-shaped, u-shaped, L-shaped, Z-shaped, C-shaped or any other suitable shape.

Those having ordinary skill in the relevant art will appreciate the advantages provided by the features of the present disclosure. For example, it is a feature of the present disclosure to provide a jack assist device which is simple in design and manufacture. Another feature of the present disclosure is to provide a jack assist device capable of reducing the time and effort required to operate the jack to hitch and unhitch a trailer. It is a further feature of the present disclosure, in accordance with one aspect thereof, to provide a jack assist device which is retractable and portable which eliminates the need of stowing separate spacers or blocking, (e.g. blocks of wood, cinder blocks, etc.).

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment.

It is to be understood that the above-described arrangements are only illustrative of the application of the principles of the present disclosure. Numerous modifications and alternative arrangements may be devised by those skilled in the art without departing from the spirit and scope of the present disclosure. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for supporting a vehicle comprising:
   a vehicle jack in mechanical communication with a jack foot and a striker plate;
   wherein the jack foot is rotatable relative to the vehicle jack on a rotation axis disposed on the vehicle jack;
   wherein the jack foot comprises:
      a base disposed at a distal end of the jack foot, and
      a cam surface disposed at least in part at a proximal end of the jack foot,
         wherein the cam surface is positioned such that it is adapted to interact with the striker plate to rotate the jack foot in response to movement of the vehicle jack from a lowered position to a raised position;
   a shaft connecting the jack foot to the vehicle jack;
   a shaft slot window disposed on the jack foot;
   wherein the shaft is slidably connected to the shaft slot window;
   wherein the shaft slot window comprises a non-linear shape.

2. The system of claim 1, wherein the cam surface comprises an edge of the jack foot from the proximal end of the jack foot to a back surface of the jack foot.

3. The system of claim 2, wherein the edge of the jack foot comprises a curve defining a plurality of radii extending between the rotation axis and the edge of the jack foot, such that the radii decrease in length from the proximal end of the jack foot to the back surface of the jack foot.

4. The system of claim 3, wherein the radius from the rotation axis decreases from the proximal end of the jack foot to the back surface of the jack foot at a constant rate.

5. The system of claim 3, wherein the radius from the rotation axis decreases from the proximal end of the jack foot to the back surface of the jack foot from approximately 1.3 inches near the proximal end of the jack foot to approximately 0.6 inches near the back side of the jack foot.

6. The system of claim 1, wherein the shaft comprises a bolt.

7. The system of claim 1, wherein the shaft is disposed at the rotation axis.

8. The system of claim 1, wherein:
the shaft is disposed at a proximal end of the shaft slot window in response to the jack foot being unloaded; and
the shaft is disposed at a distal end of the shaft slot window in response to the jack foot being loaded.

9. A system for supporting a vehicle comprising:
a vehicle jack in mechanical communication with a jack foot and a striker plate;
wherein the jack foot is rotatable relative to the vehicle jack on a rotation axis disposed on the vehicle jack;
wherein the jack foot comprises a base disposed at a distal end of the jack foot and a cam surface disposed at least in part at a proximal end of the jack foot;
wherein the cam surface is positioned such that it is adapted to interact with the striker plate to rotate the jack foot in response to movement of the vehicle jack from a lowered position to a raised position;
a shaft connecting the jack foot to the vehicle jack;
a slot window disposed on the jack foot;
wherein the shaft is slidably connected to the shaft slot window;
wherein the shaft is disposed at a proximal end of the shaft slot window in response to the jack foot being unloaded;
wherein the shaft is disposed at a distal end of the shaft slot window in response to the jack foot being loaded; and
wherein the shaft slot window comprises a shape selected from the group consisting of a dog-leg, a v-shape, a u-shape, an L-shape, a Z-shape, and a C-shape.

10. A system for supporting a vehicle comprising:
a vehicle jack in mechanical communication with a jack foot and a striker plate;
wherein the jack foot is rotatable relative to the vehicle jack on a rotation axis disposed on the vehicle jack;
wherein the jack foot comprises a base disposed at a distal end of the jack foot and a cam surface disposed at least in part at a proximal end of the jack foot;
wherein the cam surface is positioned such that it is adapted to interact with the striker plate to rotate the jack foot in response to movement of the vehicle jack from a lowered position to a raised position;
a shaft connecting the jack foot to the vehicle jack;
a slot window disposed on the jack foot;
wherein the shaft is slidably connected to the shaft slot window;
wherein the shaft is disposed at a proximal end of the shaft slot window in response to the jack foot being unloaded;
wherein the shaft is disposed at a distal end of the shaft slot window in response to the jack foot being loaded; and
wherein the proximal end of the shaft slot window is nearer to a back surface of the jack foot than is the distal end of the shaft slot window.

11. A system for supporting a vehicle comprising:
a vehicle jack in mechanical communication with a jack foot and a striker plate;
wherein the jack foot is rotatable relative to the vehicle jack on a rotation axis disposed on the vehicle jack;
wherein the jack foot comprises a base disposed at a distal end of the jack foot and a cam surface disposed at least in part at a proximal end of the jack foot;
wherein the cam surface is positioned such that it is adapted to interact with the striker plate to rotate the jack foot in response to movement of the vehicle jack from a lowered position to a raised position;
a shaft connecting the jack foot to the vehicle jack;
a slot window disposed on the jack foot;
wherein the shaft is slidably connected to the shaft slot window;
wherein the shaft is disposed at a proximal end of the shaft slot window in response to the jack foot being unloaded;
wherein the shaft is disposed at a distal end of the shaft slot window in response to the jack foot being loaded; and
wherein the proximal end of the shaft slot window is disposed between a back surface of the jack foot and vertical center axis drawn through a geometric center of a lateral side and parallel to a long axis of the jack foot.

12. A system for supporting a vehicle comprising:
a vehicle jack in mechanical communication with a jack foot and a striker plate;
wherein the jack foot is rotatable relative to the vehicle jack on a rotation axis disposed on the vehicle jack;
wherein the jack foot comprises a base disposed at a distal end of the jack foot and a cam surface disposed at least in part at a proximal end of the jack foot;
wherein the cam surface is positioned such that it is adapted to interact with the striker plate to rotate the jack foot in response to movement of the vehicle jack from a lowered position to a raised position;
a shaft connecting the jack foot to the vehicle jack;
a slot window disposed on the jack foot;
wherein the shaft is slidably connected to the shaft slot window;
wherein the shaft is disposed at a proximal end of the shaft slot window in response to the jack foot being unloaded;
wherein the shaft is disposed at a distal end of the shaft slot window in response to the jack foot being loaded; and
wherein the proximal end of the shaft slot window is disposed between a back surface of the jack foot and vertical mass axis drawn through a center of mass of the jack foot and parallel to a long axis of the jack foot.

13. A system for supporting a vehicle comprising:
a vehicle jack in mechanical communication with a jack foot and a striker plate;
wherein the jack foot is rotatable relative to the vehicle jack on a rotation axis disposed on the vehicle jack;
wherein the jack foot comprises a base disposed at a distal end of the jack foot and a cam surface disposed at least in part at a proximal end of the jack foot;
wherein the cam surface is positioned such that it is adapted to interact with the striker plate to rotate the jack foot in response to movement of the vehicle jack from a lowered position to a raised position;
wherein a distance between the base plate and a distal end of a shaft slot window is between three and nine inches.

14. The system of claim 1, wherein the striker plate is slidably connected to the vehicle jack.

15. The system of claim 1, wherein the striker plate is fixed relative to the vehicle jack.

16. A system for supporting a vehicle comprising:
a vehicle jack in mechanical communication with a jack foot and a striker plate;
wherein the jack foot is rotatable relative to the vehicle jack on a rotation axis disposed on the vehicle jack;

wherein the jack foot comprises a base disposed at a distal end of the jack foot and a cam surface disposed at least in part at a proximal end of the jack foot;

wherein the cam surface is positioned such that it is adapted to interact with the striker plate to rotate the jack foot in response to movement of the vehicle jack from a lowered position to a raised position;

wherein the jack foot further comprises a pilot hole disposed on a lateral side of the jack foot, and wherein the pilot hole is located a pre-determined distance from a front side of the jack foot, the pre-determined distance defined by a preferred location for drilling a hole in the vehicle jack to receive a shaft for connecting the jack foot to the vehicle jack.

17. The system of claim 1, further comprising a retaining pin hole disposed on a lateral side of the jack foot to receive a retaining pin holding the jack foot in the raised position.

18. The system of claim 1, wherein the jack foot further comprises a resting plate disposed between two lateral surfaces of the jack foot, wherein the resting plate includes a top surface perpendicular to the long axis of the vehicle jack when the jack foot is in a lowered position, and wherein the vehicle jack contacts the top surface of the resting plate when the jack foot is loaded.

19. The system of claim 1, wherein the jack foot further comprises a stabilizer disposed at the proximal end of the jack foot, the stabilizer to contact the vehicle jack when the jack foot is in a lowered position.

20. The system of claim 1, wherein the jack foot further comprises an inner tube window defined by an aperture in a front surface of the jack foot, the inner tube window to provide clearance between the vehicle jack and the jack foot when the jack foot is in the raised position.

21. The system of claim 1, wherein the vehicle jack is selected from the group consisting of a trailer tongue jack and a corner jack.

22. The system of claim 1, wherein the vehicle jack is selected from the group consisting of a screw jack, an electrically-actuated screw jack, and a hydraulic jack.

23. The system of claim 1, wherein the rotation axis is perpendicular to a long axis of the vehicle jack.

24. A jack foot attachable to a vehicle jack for supporting a trailer tongue comprising:
a base disposed at a distal end of the jack foot;
a cam surface disposed at least in part at a proximal end of the jack foot;
wherein the cam surface is positioned such that it is adapted to interact with a striker plate to rotate the jack foot around a rotation axis in response to movement of the jack foot from a lowered position to a raised position;
wherein the edge of the jack foot comprises a curve defining a plurality of radii extending between the rotation axis and the edge of the jack foot, such that the radii decrease in length from the proximal end of the jack foot to the back surface of the jack foot.

25. The jack foot of claim 24, wherein the cam surface comprises an edge of the jack foot from the proximal end of the jack foot to a back surface of the jack foot.

26. The jack foot of claim 24, wherein the radius from the rotation axis decreases from the proximal end of the jack foot to the back surface of the jack foot at a constant rate.

27. The jack foot of claim 24, wherein the radius from the rotation axis decreases from the proximal end of the jack foot to the back surface of the jack foot from approximately 1.3 inches near the proximal end of the jack foot to approximately 0.6 inches near the back side of the jack foot.

28. The jack foot of claim 24, further comprising a shaft to connect the jack foot to a vehicle jack.

29. The jack foot of claim 28, wherein the shaft comprises a bolt.

30. The jack foot of claim 28, wherein the shaft is disposed at the rotation axis.

31. The jack foot of claim 28, further comprising a shaft slot window disposed on the jack foot, wherein:
the shaft is slidably connected to the shaft slot window;
the shaft is disposed at a proximal end of the shaft slot window in response to the jack foot being unloaded; and
the shaft is disposed at a distal end of the shaft slot window in response to the jack foot being loaded.

32. The jack foot of claim 31, wherein the shaft slot window comprises a shape selected from the group consisting of a dog-leg, a v-shape, a u-shape, an L-shape, a Z-shape, and a C-shape.

33. The jack foot of claim 31, wherein the proximal end of the shaft slot window is nearer to a back surface of the jack foot than is the distal end of the shaft slot window.

34. The jack foot of claim 31, wherein the proximal end of the shaft slot window is disposed between a back surface of the jack foot and vertical center axis drawn through a geometric center of a lateral side and parallel to a long axis of the jack foot.

35. The jack foot of claim 31, wherein the proximal end of the shaft slot window is disposed between a back surface of the jack foot and vertical mass axis drawn through a center of mass of the jack foot and parallel to a long axis of the jack foot.

36. The jack foot of claim 24, wherein a distance between the base plate and a distal end of a shaft slot window is between three and nine inches.

37. The jack foot of claim 24, wherein the striker plate is slidably connectable to the vehicle jack.

38. The jack foot of claim 24, wherein the striker plate is fixedly connectable relative to the vehicle jack.

39. The jack foot of claim 24, wherein the jack foot further comprises a pilot hole disposed on a lateral side of the jack foot, and wherein the pilot hole is located a pre-determined distance from a front side of the jack foot, the pre-determined distance defined by a preferred location for drilling a hole in a vehicle jack to receive a shaft for connecting the jack foot to the vehicle jack.

40. The jack foot of claim 24, further comprising a retaining pin hole disposed on a lateral side of the jack foot to receive a retaining pin holding the jack foot in the raised position.

41. The jack foot of claim 24, wherein the jack foot further comprises a resting plate disposed between two lateral surfaces of the jack foot, wherein the resting plate includes a top surface perpendicular to the long axis of the jack foot when the jack foot is in a lowered position, and wherein a vehicle jack contacts the top surface of the resting plate when the jack foot is loaded.

42. The jack foot of claim 24, wherein the jack foot further comprises a stabilizer disposed at the proximal end of the jack foot, the stabilizer to contact a vehicle jack when the jack foot is in a lowered position.

43. The jack foot of claim 24, wherein the jack foot further comprises an inner tube window defined by an aperture in a front surface of the jack foot, the inner tube window to provide clearance between a vehicle jack and the jack foot when the jack foot is in the raised position.

44. The jack foot of claim 24, wherein the vehicle jack is selected from the group consisting of a trailer tongue jack and a corner jack.

45. The jack foot of claim 24, wherein the vehicle jack is selected from the group consisting of a screw jack, an electrically-actuated screw jack, and a hydraulic jack.

46. The jack foot of claim 24, wherein the rotation axis is disposed on a vehicle jack and perpendicular to a long axis of the vehicle jack.

47. A jack foot comprising:
a base disposed at a distal end of the jack foot;
a cam surface disposed at least in part at a proximal end of the jack foot, wherein the cam surface:
  is positioned such that it is adapted to interact with a striker plate to rotate the jack foot around a rotation axis in response to movement of the jack foot from a lowered position to a raised position;
  comprises an edge of the jack foot from the proximal end of the jack foot to a back surface of the jack foot; and
  comprises a curve defining a plurality of radii extending between the rotation axis and the edge of the jack foot, such that the radii decrease in length from the proximal end of the jack foot to the back surface of the jack foot;
  wherein the radius decreases from approximately 1.3 inches to approximately 0.6 inches;
a bolt disposed at the rotation axis to connect the jack foot to a vehicle jack;
a shaft slot window disposed on the jack foot, wherein:
  the bolt is slidably connected to the shaft slot window;
  the bolt is disposed at a proximal end of the shaft slot window in response to the jack foot being unloaded;
  the bolt is disposed at a distal end of the shaft slot window in response to the jack foot being loaded;
  the shaft slot window comprises a dog-leg shape;
  the proximal end of the shaft slot window is nearer to a back surface of the jack foot than is the distal end of the shaft slot window;
  the proximal end of the shaft slot window is disposed between a back surface of the jack foot and vertical center axis drawn through a geometric center of a lateral side and parallel to a long axis of the jack foot; and
  the proximal end of the shaft slot window is disposed between a back surface of the jack foot and vertical mass axis drawn through a center of mass of the jack foot and parallel to a long axis of the jack foot;
a pilot hole disposed on a lateral side of the jack foot, and wherein the pilot hole is located a pre-determined distance from a front side of the jack foot, the pre-determined distance defined by a preferred location for drilling a hole in a vehicle jack to receive the bolt for connecting the jack foot to the vehicle jack;
a resting plate disposed between two lateral surfaces of the jack foot, wherein the resting plate includes a top surface perpendicular to the long axis of the jack foot when the jack foot is in a lowered position, and wherein the vehicle jack contacts the top surface of the resting plate when the jack foot is loaded;
an inner tube window defined by an aperture in a front surface of the jack foot, the inner tube window to provide clearance between the vehicle jack and the jack foot when the jack foot is in the raised position; and
a stabilizer disposed at the proximal end of the jack foot, the stabilizer to contact the vehicle jack when the jack foot is in a lowered position; and
wherein the striker plate is slidably connectable to the vehicle jack; and
wherein a distance between the base and the distal end of the shaft slot window is approximately six inches.

48. A system for supporting a vehicle comprising:
a vehicle jack in mechanical communication with a jack foot;
wherein the jack foot is rotatable relative to the vehicle jack on a rotation axis disposed on the vehicle jack;
wherein the jack foot comprises:
  a base disposed at a distal end of the jack foot;
  a front sidewall, and two opposing lateral sidewalls comprising a first lateral sidewall and a second lateral sidewall, wherein the front sidewall resides between and intercouples the two opposing lateral sidewalls to thereby form a three-sided jack foot body having a distal end connected to the base;
  a first shaft slot formed in the first lateral sidewall, wherein said first shaft slot comprises a substantially straight proximal section terminating in a proximal end and a substantially straight distal section terminating in a distal end, wherein the proximal section and the distal section intersect and form an angle θ therebetween.

49. The system of claim 48, wherein a second shaft slot is formed in the second lateral sidewall, wherein said second shaft slot comprises a substantially straight proximal section terminating in a proximal end and a substantially straight distal section terminating in a distal end, wherein the proximal section and the distal section intersect and form an angle θ therebetween, the system further comprising:
a shaft disposed within and extending between the first shaft slot and the second shaft slot, and wherein the jack includes a moveable jack member residing between the first lateral sidewall and the second lateral sidewall, such that said shaft extends from the first shaft slot in the first lateral sidewall through said moveable jack member and into the second shaft slot in the second lateral sidewall.

50. The system of claim 48, wherein the angle is an obtuse angle.

51. The system of claim 50, wherein the angle is within a range of 95 degrees to 175 degrees.

52. The system of claim 51, wherein the angle is 135 degrees.

53. The system of claim 48, wherein the shaft slot resides in the upper proximal third of the jack foot body.

54. A system for supporting a vehicle comprising:
a vehicle jack in mechanical communication with a jack foot and a jack foot motion-path-altering member;
wherein the jack foot is rotatable relative to the vehicle jack on a rotation axis disposed on the vehicle jack;
wherein the jack foot comprises:
  a base disposed at a distal end of the jack foot, and
  a cam surface,
    wherein the cam surface is positioned such that it is adapted to interact with the jack foot motion-path-altering member to rotate the jack foot in response to movement of the vehicle jack from a lowered position to a raised position;
a shaft connecting the jack foot to the vehicle jack; and
a shaft slot window disposed on the jack foot;
wherein the shaft is slidably connected to the shaft slot window;
wherein the shaft slot window comprises a non-linear shape.

55. A system for supporting a vehicle comprising:
a vehicle jack in mechanical communication with a jack foot and a jack foot motion-path-altering member;
wherein the jack foot is rotatable relative to the vehicle jack on a rotation axis disposed on the vehicle jack;
wherein the jack foot comprises:

a three-sided jack foot body having three side walls and an open side, and a resting plate surrounded by said three side walls;

a base disposed at a distal end of the jack foot, and a cam surface;

wherein the cam surface is positioned such that it is adapted to interact with the jack foot motion-path-altering member to rotate the jack foot in response to movement of the vehicle jack from a lowered position to a raised position.

56. The system of claim 55, further comprising a base disposed on a distal end of the jack foot body, wherein the base is wider in all directions than, and thereby surrounds a perimeter of, said distal end of the jack foot body.

57. A system for supporting a vehicle comprising:

a vehicle jack in mechanical communication with a jack foot and a jack foot motion-path-altering member;

wherein the jack foot is rotatable relative to the vehicle jack on a rotation axis disposed on the vehicle jack;

wherein the jack foot comprises:

a three-sided jack foot body having three side walls and an open side, said three side walls including a front side, and a window formed in said front side for receiving a portion of the vehicle jack therethrough during operation os said vehicle jack;

a base disposed at a distal end of the jack foot, and a cam surface, wherein the cam surface is positioned such that it is adapted to interact with the jack foot motion-path-altering member to rotate the jack foot in response to movement of the vehicle jack from a lowered position to a raised position.

\* \* \* \* \*